United States Patent [19]

Tobiasz

[11] 4,387,737
[45] Jun. 14, 1983

[54] HYDRAULIC ASSISTED STEERING DEVICE FOR A MOTOR VEHICLE

[75] Inventor: André Tobiasz, Boulogne-Billancourt, France

[73] Assignee: Societe Anonyme DBA, Paris, France

[21] Appl. No.: 224,361

[22] Filed: Jan. 12, 1981

[51] Int. Cl.³ ............................................. B62D 5/08
[52] U.S. Cl. ............................. 137/625.21; 91/375 A
[58] Field of Search ......... 267/154; 91/375 R, 375 A, 91/376; 137/625.21, 625.22, 625.23

[56] References Cited

U.S. PATENT DOCUMENTS

| | | | |
|---|---|---|---|
| 3,393,608 | 7/1968 | Saunders | 91/375 A |
| 3,748,687 | 7/1973 | Romberg | 207/154 X |
| 4,217,811 | 8/1980 | Dzioba | 91/375 A |
| 4,252,207 | 2/1981 | Dauvergne | 91/375 A X |
| 4,310,063 | 1/1982 | Nishikawa | 91/375 A X |

*Primary Examiner*—Alan Cohan
*Attorney, Agent, or Firm*—Paul D. Schoenle; Ken C. Decker

[57] ABSTRACT

A hydraulic assisted steering device for a motor vehicle, of the type having a rotary distributor, comprising a distribution sleeve which extends a steering control member, a rotor of generally tubular shape, which is disposed within the sleeve, a torsion bar which is housed within the rotor and which has one end fixed to the rotor and the other end fixed to the steering control member, and a hydraulic circuit for generating a control value in response to an angular movement imparted to the rotor.

According to the invention, the torsion bar comprises an active portion of constant section of high-resiliency steel, and two end members and ordinary steel, which are respectively engaged on the ends of the active portion and are fixed to said ends, the end members being respectively fixed with respect to the rotor and the steering control member.

8 Claims, 5 Drawing Figures

HYDRAULIC ASSISTED STEERING DEVICE FOR A MOTOR VEHICLE

The present invention concerns a hydraulic assisted steering device for a motor vehicle of the type having a rotary distributor comprising a distribution sleeve which extends a steering control member, a rotor of generally tubular shape, which is disposed within the sleeve, a torsion bar which is housed within the rotor and which has one end fixed to the rotor and the other end fixed to the steering control member, and a hydraulic circuit for generating a control value in response to an angular movement imparted to the rotor.

A device of this type is described for example in French Pat. No. 2 178 379. In the known device, the torsion bar which forms the resilient connection between the rotor and the steering control member is made of a high-resiliency steel and has a first end portion which is fixed to the rotor, whose diameter is equal to the inside diameter of the rotor, a central portion of smaller diameter, and a second end portion which is fixed to the steering control member and which is received in a bore formed in the steering control member, the diameter of the second portion being substantially the same as that of the first portion. The connection between the central portion and the end portions is made progressively, according to a curvated correcting outline.

Disadvantageous stress concentrations occur in those connecting regions of variable section, and such stress concentrations increase the fatigue of the torsion bar. The present invention aims to overcome this disadvantage and for this purpose, in the assisted steering device according to the invention, the torsion bar comprises an active portion of constant section made of high-resiliency steel and two end members made of ordinary steel, which are respectively engaged on the ends of the active portion and which are fixed thereto, the end members being respectively fixed with respect to the rotor and the steering control member.

The invention makes it possible to avoid the stress concentrations since the active portion is of constant section and the end members are of a material which is much more malleable than the material of the active portion.

Machining is markedly simplified since the active portion, being of constant section, can be produced by drawing.

In addition, as only the active portion is of high-resiliency material, it is possible to use a steel which has a much higher level of strength than in the prior art, in which the torsion bar is in one piece and in which, in consequence, the end portions are also of high-resiliency steel. This makes it possible to reduce the length of the torsion bar and therefore the space occupied by the device, this advantage being important as far as vehicle components are concerned.

The end members are advantageously fixed to the active portion by a force fit process or by crimping of the end members which for that purpose are provided with blind bores of a diameter adapted to the type of operation envisaged.

The invention will be better appreciated from the following description which refers to the accompanying drawings wherein.

Figure 1:
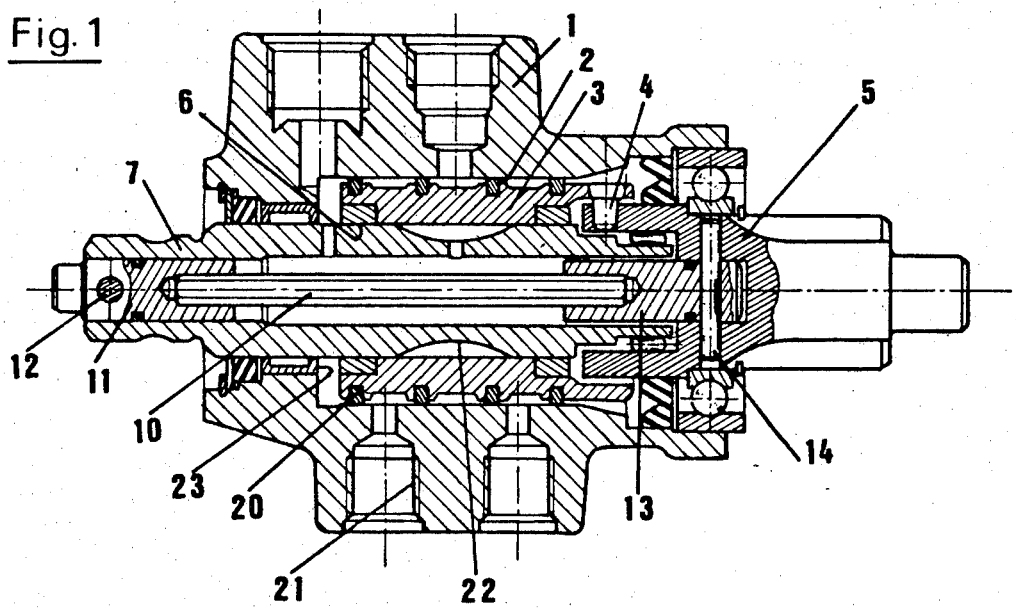
FIG. 1 is a view in axial section of a distributor for assisted steering, in accordance with the invention.

The distributor for a hydraulic assisted steering device as shown in FIG. 1 comprises a body 1 provided with bore 2. Mounted in the bore 2 is a distribution sleeve 3 which is fixed in position by means of a pin 4 to a steering control member 5 which in the present embodiment comprises the pinion of a rack and pinion steering assembly.

Mounted in the bore 6 of the distribution sleeve 3 is a tubular rotor 7, the rotor being the component to which the steering forces produced by the driver are applied.

The rotor 7 is resiliently connected to the pinion 5 by a torsion bar which, in accordance with the invention, comprises a central portion 10, an end member 11 which is fixed to the rotor by means of a pin 12 and a second end member 13 which is fixed to the pinion 5 by a pin 14, the two end members being rigidly connected to the central portion 10.

The central portion 10 alone is of high-quality steel, for example spring steel of type 50 CV4 with a strength $R_N=150$ kg/mm$^2$. By way of contrast, the end members are of ordinary steel, for example of type XC 35, with a strength $R_N=45$ kg/mm$^2$.

The central portion 10 is of constant section, advantageously being a prismatic section and in particular hexagonal, as in the illustrated embodiment.

Figure 2A:
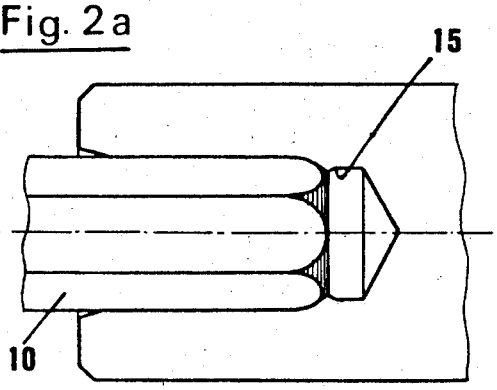
FIGS. 2a and 2b illustrate views in section of parts of a method of assembly of the torsion bar.
Figure 2B:
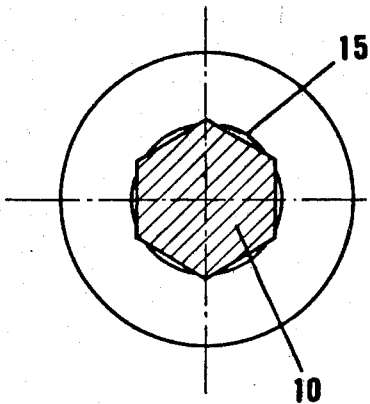

The method of connecting the end members to the central portion must ensure a rigid connection. FIGS. 2a and 2b show a method of assembly by force fitting the end of the central portion in a blind bore 15 formed in the end member, the diameter of the bore being less than the circle circumscribed about the section of the portion 10.

Figure 3A:
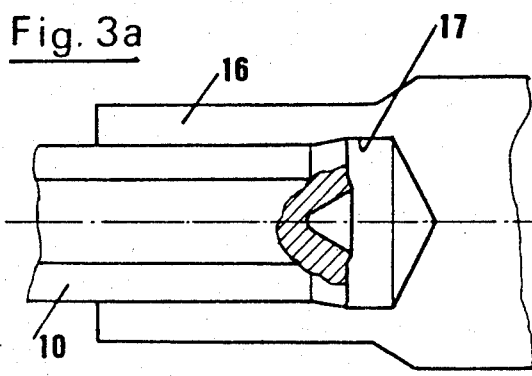
FIGS. 3a and 3b show another method of assembly of the torsion bar.
Figure 3B:
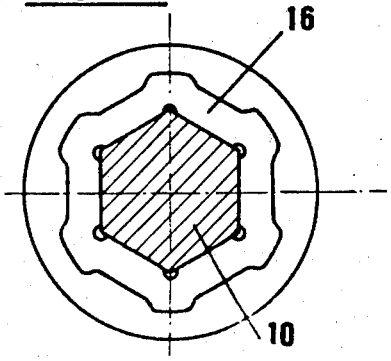

FIGS. 3a and 3b show another method of assembly wherein the part 16 of the end member 11 or 13 into which the end of the central portion 10 engages is crimped radially onto the end of the central portion. In this case, the blind bore 17 formed in each end member is of a diameter such that it can receive the end of the central portion 10, with clearance.

As for the rest, the device illustrated is conventional, in particular as regards the hydraulic elements. It will be pointed out only that the space between the distribution sleeve 3 and the body 1 is sealingly partitioned by seals as illustrated at 20, that the chambers so defined are respectively connected by ports as indicated at 21 to a pressure system and to a discharge means, and to the two compartments of an assistance jack (not shown), and that conduits as indicated at 22 and 23 are provided, the arrangement being such that when the rotor 7 turns as a consequence of a steering movement, the relative rotation occurring between the rotor and the sleeve results in an imbalance between the pressures of the assistance jack, which depends on the steering angle. All this is known and there would be no need for detailed explanation in this respect.

Furthermore, the active or control portion 10 at least may be advantageously submitted to a "shot-peening" treatment in order to eliminate superficial miscroscopic irregularities and cavities at the rough surface of the bar forming said active portion which constitute incipient features.

I claim:

1. A hydraulic assisted steering device for a motor vehicle, of the type including a rotary distributor comprising a distribution sleeve extending from a steering control member, a rotor of generally tubular shape which is rotatably disposed within said sleeve, a torsion bar which is housed within said rotor and which has one end fixed to said rotor and the other end fixed to said steering control member, and a hydraulic circuit for producing a control value in response to an angular movement imparted to said rotor, characterized in that said torsion bar comprises an active portion of constant section made of high-resiliency steel and two end members made of ordinary steel, the ends of said active portion being respectively fixed in a blind bore formed in each of said end members and fixed thereto, said end members being respectively fixed with respect to said rotor and said steering control member.

2. A device according to claim 1, characterized in that the active portion is of prismatic cross-section.

3. A device according to claim 2, characterized in that the active portion is of hexagonal cross-section.

4. A device according to either claims 1, 2 or 3, characterized in that the end members are force fitted onto the respective ends of the active portion.

5. A device according to one of the claims 1, 2 or 3, characterized in that the part of each end member into which the respective end of the active portion is engaged is crimped radially onto said end.

6. A device according to claim 1, characterized by a "shot-peening" treated active portion.

7. A device according to claim 1, characterized in that said end members are respectively secured to said rotor and said steering control member by pin members.

8. A device according to claim 1, characterized in that said active portion is completely confined within said rotor.

* * * * *